United States Patent [19]

Hunt

[11] Patent Number: 4,644,169
[45] Date of Patent: Feb. 17, 1987

[54] LASER ENERGY TRANSDUCER

[76] Inventor: Stanley E. Hunt, 934 Junipero, Duarte, Calif. 91010

[21] Appl. No.: 752,805

[22] Filed: Jul. 8, 1985

[51] Int. Cl.[4] .......................... H05B 1/00; G21D 5/00
[52] U.S. Cl. ................................ 250/432 R; 60/203.1
[58] Field of Search .................. 60/203.1; 250/432 R, 250/437, 493.1; 219/121 L, 121 FS

[56] References Cited

U.S. PATENT DOCUMENTS 3,138,697 6/1964 Banca et al. ...................... 250/504
3,705,985 12/1972 Manning et al. ................ 250/492.1
4,509,333 4/1985 Nussdorfer et al. ................. 60/723

Primary Examiner—Bruce C. Anderson
Assistant Examiner—Paul A. Guss
Attorney, Agent, or Firm—Roger A. Marrs

[57] ABSTRACT

Apparatus is disclosed herein, for converting laser energy to thermal energy for a variety of purposes, which includes a conical laser beam collector for gathering or receiving impinging beams or rays that has a plurality of coaxially disposed annular shoulders arranged either along the external or internal surfaces of the collector adapted directly to receive the laser beams or rays. A liquid circulating system includes a cylinder housing the conical collector having a plurality of coaxial coils arranged about its external surface and, in one version, joined with an internal coiled spiral carried on the conical collector. The liquid circulating system serves as a heat exchanger to convert the heat gathered by the conical collector into superheated liquid carried by the liquid circulating system for ultimate use in prime mover or generator applications.

10 Claims, 4 Drawing Figures 4,644,169

LASER ENERGY TRANSDUCER

BACKGROUND OF THE INVENTION

1. Field of the Invention

The present invention relates to apparatus for collecting, intensifying and storing energy and, more particularly, to a novel laser energy transducer for converting laser energy to thermal energy so that the thermal energy may be directly transferred to electric power or the like for a variety of applications.

2. Brief Description of the Prior Art

In the past, it has been the conventional practice to employ heat exchangers to convert one form of energy into another so that the resultant energy is stored for a variety of uses. As an example, solar rays are collected, intensified and converted into superheated water via the heat exchanger so that the superheated water can be used for operating steam generators, prime movers or the like. Generally, such solar converters employ large area arrays of panels, parabolic dishes and the like for collecting the solar energy and employs a plurality of tubular or conduit type runs of tubing serving as a heat exchanger for circulating liquid about the solar ray collector. Although these prior devices have been successful in converting solar energy, problems and difficulties have been encountered which stem largely from the fact that the apparatus employed is not suitable for collecting energy from other sources such as laser transmitters or laser prime sources. The relative size of such prior art collectors and systems preclude the use of laser sources as a primary source of energy so that the prior energy gathering and heat exchanging systems are totally inadequate and unsuitable for converting laser energy into thermal energy.

Furthermore, other problems stem from the fact that the majority of solar heaters or heat exchanging devices utilized do not generate and store medians at temperatures of sufficient intensity for operation of power plants, generators and prime movers during periods of time of darkness or during inclement weather when clouds and the like reduce the solar rays received by the collector.

Therefore, a long standing need has existed to provide a novel conversion means for transforming laser energy into thermal energy so that the thermal energy may be directly applied to a variety of uses.

SUMMARY OF THE INVENTION

Accordingly, the above problems and difficulties are obviated by the present invention which provides a novel laser energy transducer having a cylindrical housing enclosing a conical shaped collector means for receiving impinging laser beams or rays and which further includes a plurality of coils disposed in fixed coaxial relationship with respect to the conical collector adapted to receive heat or thermal energy collected by the impinging laser beams or rays whereby circulating fluid or liquid through the coils becomes superheated.

In one form of the invention, the laser energy rays or beams impinge against a plurality of coaxial shoulders arranged along the length of the cone on either its internal surface or its external surface. The impingement of the laser energy against the shoulders of the conical collector either reflect against the wall of the cylindrical enclosure or housing for conductive directly to the fluid circulating through the ducting or the energy absorbed by the conical collector is directly applied to a spiral duct of tubing closely disposed about the conical collector for transference of the laser energy into thermal energy of the fluid or liquid.

Therefore, it is among the primary objects of the present invention to provide a novel laser energy transducer for converting laser energy into thermal energy adaptable to be applied for a variety of uses.

Another object of the present invention is to provide a novel laser energy converter taking the form of a transducer capable of transferring laser energy to thermal energy so as to directly operate a variety of power plants, generators or the like.

Yet another object of the present invention is to provide a novel apparatus for transferring laser energy to electric, steam or thermal energy employing an apparatus which is extremely small in size, relatively inexpensive and may be used by persons without high technical skill.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF THE PREFERRED EMBODIMENT

Figure 1:
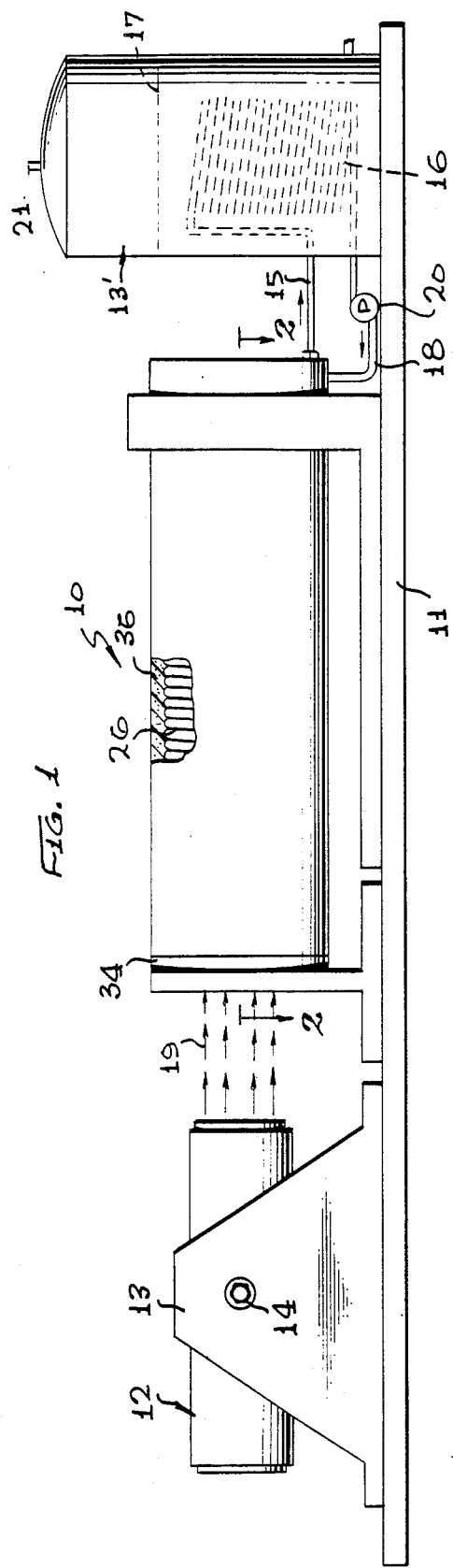
FIG. 1 is a side elevational view diagrammatic illustrating a typical system incorporating the present invention for converting laser energy into thermal energy via the inventive transducer.

Referring to FIG. 1, the novel laser energy transducer of the present invention is indicated in the general direction of arrow 10 which is illustrated as being mounted on a platform 11 intermediate of a laser source or transmitter 12 and a steam generator 13'. The laser source 12 is of conventional design and is of a super flow type which is mounted on a pivotal base 13 including a frictional adjustment means indicating by numeral 14. By means of the adjustment, the ray or beam emitting end of the laser source may be suitably adjusted so as to be in alignment with the transducer 10.

The output from the transducer 10 is along output 15 to the steam generator 13 where it is recirculated through respective coils of a heat exchager 16 submerged in water 17. After processing through the heat exchanger, the liquid is introduced to the transducer 10 through conduit 18. Pump 20 is operably connected in the recirculation system to assure movement of the fluid or liquid enclosed within the ducts or tubing. The water 17 heated by the heat exchanger 16 creates steam in the upoer end of the tank 13 and is exhausted via duct 21 where it is conducted to a prime mover or turbo generator application.

Figure 2:
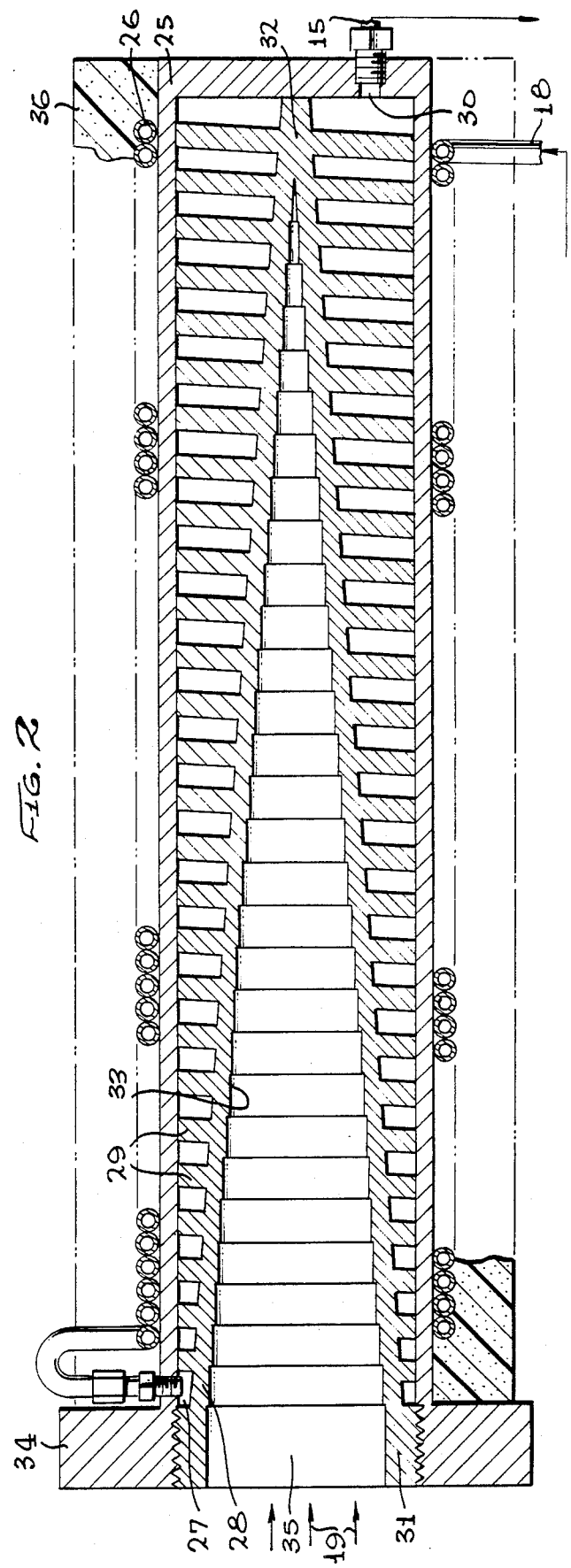
FIG. 2 is an enlarged longitudinal cross-sectional view of the laser transducer shown in FIG. 1 as taken in the direction of arrows 2—2 thereof.

Referring now in detail to FIG. 2, the novel infrared transducer 10 includes an elongated cylindrical housing 25 having a plurality of coils, such as coil 26, coaxially disposed and carried about the external surface of the housing along its entire length. One end of the plurality of coils terminates in the inlet duct or tube 18 while the opposite end of the plurality of coils terminates in the end of a spiral chamber indicated by numeral 27 disposed about a conical member 28. The conical member 28 serves as a heat collector and includes a plurality of outwardly radiating fins such as fin 29 which is continuous from one end of the member 28 to its opposite end along the external surface thereof so as to form a spiral along the entire length of the collector member 28. It is to be particularly noted that the member 28 fits into the internal bore of the cylinder 25 and substantially occupies the entire interior thereof with the exception of the defined spiral space interconnecting the end of tube 26 with an outlet leading to duct 15. The outlet is identified by numeral 30. Therefore, it can be seen that a complete circulating fluid flow is defined between the inlet duct 18 and the outlet port 30 via the plurality of coils 26 and the continuous spiral opening existing between the continuous fin 29.

It is also to be noted that the interior of the conical member 28 is hollow and reduces in diameter from its base end identified by numeral 31 to an apex end 32. The inner surface of the conical collector member 28 is provided with a plurality of concentric shoulders such as shoulder 33 which increases the total area of the surface against which the laser beams or rays 19 will impinge.

The base end 31 of the conical member is open and is provided with threads for a threaded connection with the housing flange 34. Therefore, it can be seen that the conical member 28 may be readily inserted or removed from the cylinder 25 for service and maintenance purposes. The opening, broadly identified by numeral 35 in the base 31 is in alignment with the laser source 12 so that the beams or rays 19 primarily in the infrared range are permitted to enter the interior of the conical collector member for impingement against the surface area of the member. Upon impingement, heat is generated within the composition of the collector member and, in turn, is induced into the fluid carried in the spiral space between the spiral fin 29. Thus, a heat exchanger action is provided so that the fluid is superheated and pressurized through the output port 30 into the duct 15.

In order to maintain proper heat exchange, as well as to maintain the liquid or fluid contained in coils 26 at a constant temperature, insulation 36 may be provided about the plurality of coils.

Figure 3:
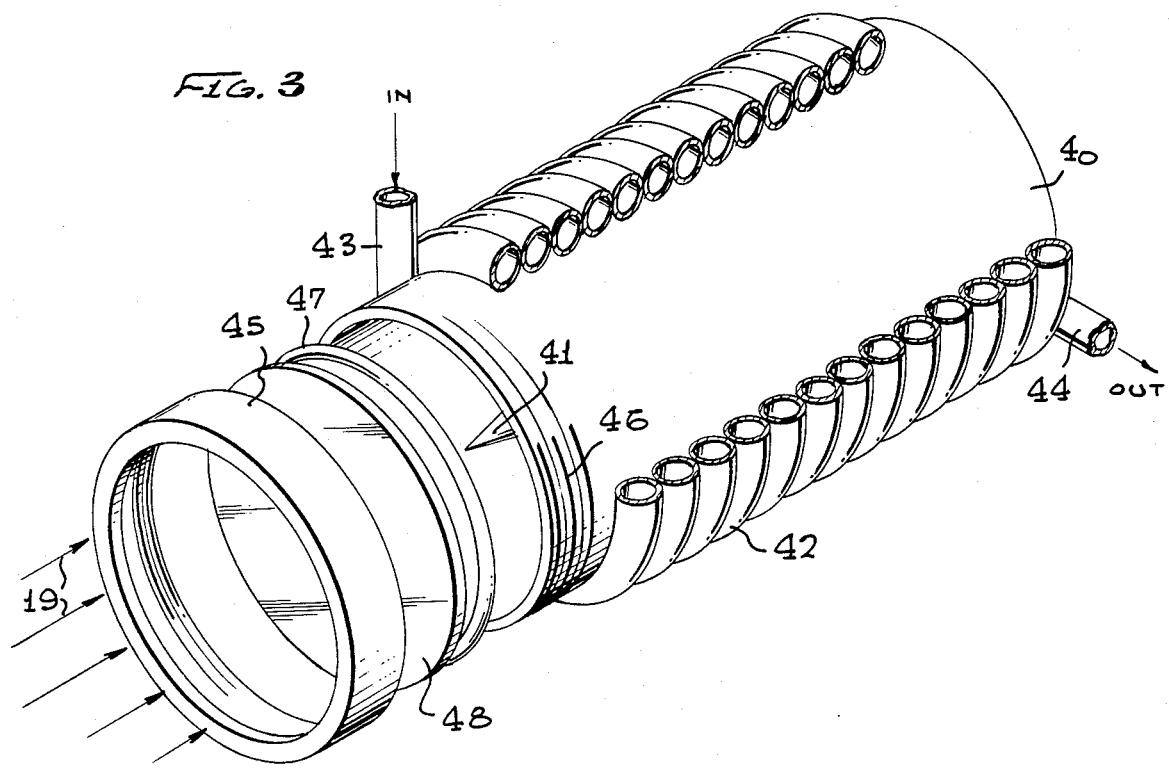
FIG. 3 is a perspective view of another embodiment of the laser energy transducer of the present invention.
Figure 4:
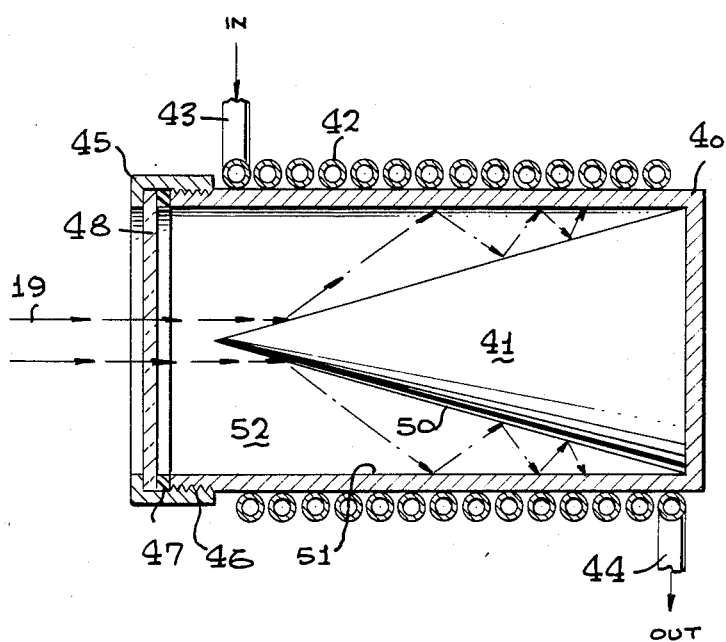
FIG. 4 is a longitudinal cross-sectional view of the transducer apparatus shown in FIG. 3.

Referring now in detail to FIGS. 3 and 4, another embodiment of the present invention is illustrated which includes a hollow cylinder 40 containing a conical collector member 41 and which includes a plurality of coils, such as coil 42, surrounding the exterior surface of the cylinder 40. Input into the duct or coils 42 for circulating a fluid is via inlet 43 located in one end of the coil while an exit or output tube 44 is coupled to the opposite end of the coils.

It is to be particularly noted that the conical member 41 is inverted or reversed from the direction as shown in the embodiment of FIGS. 1 and 2 so that the infrared laser rays or beams impinge against the inclining exterior surface of the conical member rather than the declining interior surface. Also, it is to be noted that the end of the cylinder 40 adjacent to the apex end of the conical member terminates in a lens 45 which is threadably coupled to the end of the housing 40 by means of threads 46. Also, a seal 47, of the elastrometric type is employed. The plurality of infrared laser rays 19 progress through a suitable glass 48 and strikes the surface of the conical member 41.

Referring now in detail to FIG. 4, it can be seen that the infrared laser beams or rays 19 enter the cylinder 40 through the glass 48 and strikes or impinges against the sloping external surface of the conical member 41. The rays are deflected or reflected from the external conical surface 50 against the inner cylindrical wall surface 51 of the cylinder 40 where the heat is absorbed into the cylinder material and exchanged into the liquid flowing through the plurality of coils 42. Furthermore, it is to be understood that an enclosed and sealed compartment 52 is defined between the opposing surfaces of the inner cylinder wall 51, the external conical member surface 50 and the surface of the glass 48. This sealed compartment may be employed to contain a gaseous atmosphere or even a vacuum. Such a gaseous atmosphere may be represented by the presence of oxygen or some form of inert gas.

Therefore, with respect to the embodiment shown in FIGS. 3 and 4, it can be seen that the infrared beams 19 pass through the sealed glass 48 and strike or impinge against the reflective cone surface 50. The reflected beams or rays are conducted through the gaseous atmosphere and reflected onto the inner surface 51 of the cylinder. The resulting heat from the continuous process is absorbed into the cylinder wall and then into the tubing coils carrying a liquid or fluid medium. The liquid or fluid medium is introduced via inlet 43 and pumped out through the exit tube 44. Heat is collected in the conical member 41 as well as in the walls of the cylinder 40 where it is then transferred into the flow of liquid through the tube. This flow heats and continues through the output tubing 44 where it may be applied to a heat exchanger for power processing. The liquid is then cooled, condensed and pumped back through the tubing inlet at tube 43 to complete the circulation and process. The cap 45 and the seal 47 retain the glass 48 in position and suitably seal the compartment 52 from external or ambient atmosphere.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A laser energy transducer for converting infrared radiant energy into thermal energy comprising the combination of:
   an elongated housing having an open end leading into a hollow interior;
   a conical collector having a sloping wall surface coaxially disposed with respect to said housing and said open end within said hollow interior;
   fluid circulating means coaxially disposed about said housing in fixed heat transference relationship; and
   a source of high intensity parallel laser beams or rays in alignment with said conical collector for transmitting said beams or rays through said housing opening to impinge against said conical collector sloping wall.

2. The invention as defined in claim 1 wherein:

said conical collector stores thermal energy produced by said impinging laser beams or rays; and said stored thermal energy being transferable to said housing for conductance to said fluid circulating means.

3. The invention as defined in claim 2 wherein:

said fluid circulating means includes a length of tubing arranged in a plurality of coils extending along the length of said housing and having a fluid circulating therethrough.

4. The invention as defined in claim 3 including:

a removable cap carried on said housing having a laser beam or ray transparent plate closing said housing opening and said interior; and said closed housing interior having a gaseous atmosphere.

5. The invention as defined in claim 3 wherein:

said conical collector is mounted in said housing interior so that its base end is disposed at said housing open end exposing the inner sloping surface of said conical collector to said laser beams or rays.

6. The invention as defined in claim 5 wherein:

said conical collector includes a spiral fin outwardly projecting from its external sloping surface terminating in abutment with said housing in thermal transference relationship and said fin defining a spiral gap extending from the base end of said conical collector to the apex end thereof;

said plurality of tubing coils terminating at one end through said housing in communication with said spiral gap for circulating fluid therethrough in heat exchanging relationship with said fin; and output duct communicating with said spiral gap adjacent its apex end coupled to the other end of said tubing coils.

7. The invention as defined in claim 6 wherein:

said sloping inner surface of said conical collector provided with a plurality of annular shoulders concentrically disposed with respect to said conical collector and said housing.

8. The invention as defined in claim 3 wherein:

said conical collector includes a base end and an apex end;

said apex end terminating in proximity to said housing opening; and said external sloping surface adapted to receive and reflect said laser beams or rays against said housing for thermal transference therethrough into said fluid circulating means.

9. The invention as defined in claim 8 wherein:

said housing inner surface defining said interior cavity is a mirrored surface.

10. The invention as defined in claim 9 wherein:

said interior cavity is a sealed cavity enclosed in a gaseous atmosphere.

* * * * *